US011052948B2

(12) United States Patent
Williams (10) Patent No.: US 11,052,948 B2
(45) Date of Patent: Jul. 6, 2021

(54) VEHICLE HOOD OUTER PANEL STRETCHING MECHANISM

(71) Applicant: Toyota Motor Engineering & Manufacturing North America, Inc., Plano, TX (US)

(72) Inventor: Paxton S. Williams, Milan, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 126 days.

(21) Appl. No.: 16/559,140

(22) Filed: Sep. 3, 2019

(65) Prior Publication Data

US 2021/0061359 A1    Mar. 4, 2021

(51) Int. Cl.
*B62D 25/12* (2006.01)
*B62D 25/10* (2006.01)
*B62D 21/15* (2006.01)
*B60R 21/02* (2006.01)
*B60R 21/00* (2006.01)

(52) U.S. Cl.
CPC .......... *B62D 21/152* (2013.01); *B60R 21/02* (2013.01); *B62D 25/12* (2013.01); *B60R 2021/0004* (2013.01); *B62D 21/15* (2013.01); *B62D 25/105* (2013.01)

(58) Field of Classification Search
CPC ...... B62D 21/152; B62D 21/15; B62D 25/12; B62D 25/105; B60R 21/02; B60R 2021/0004; B60R 2021/0023; B60R 21/34
USPC .............. 296/187.09, 193.09, 193.11, 187.1; 180/69.22, 69.21
See application file for complete search history.

(56) References Cited

U.S. PATENT DOCUMENTS

| 5,605,371 A | 2/1997 | Borchelt et al. | |
|---|---|---|---|
| 2007/0132279 A1* | 6/2007 | Donabedian | B62D 25/105 296/193.11 |
| 2015/0069786 A1* | 3/2015 | Benson | B62D 25/105 296/187.09 |
| 2015/0191205 A1* | 7/2015 | Gardynik | B62D 25/12 296/187.09 |

FOREIGN PATENT DOCUMENTS

| DE | 102005027124 A1 | 12/2006 |
|---|---|---|
| FR | 2915168 A1 | 10/2008 |

* cited by examiner

*Primary Examiner* — Dennis H Pedder
*Assistant Examiner* — Joyce Eileen Hill
(74) *Attorney, Agent, or Firm* — Christopher G. Darrow; Darrow Mustafa PC (57) ABSTRACT

An assembly includes a vehicle hood outer panel and hood panel stretching mechanism coupled to the hood panel. The stretching mechanism includes a first hood attachment portion affixed to the panel at a first location, and a second hood attachment portion affixed to the panel at a second location. A first arm has a first end coupled to the first attachment portion, and a second end opposite the first end. A second arm has a first end coupled to the second attachment portion, and a second end opposite the first end. The mechanism is structured so that simultaneous movement of the first arm second end and the second arm second end toward a line extending between the first attachment portion and the second attachment portion causes movement of the first attachment portion and the second attachment portion to increase a spacing between the hood attachment portions.

12 Claims, 5 Drawing Sheets

VEHICLE HOOD OUTER PANEL STRETCHING MECHANISM

TECHNICAL FIELD

The present invention relates to vehicle hoods and, more particularly, to a mechanism for stretching an outer panel of a vehicle hood prior to buckling responsive to a front impact force.

BACKGROUND

In the event of a front crash event, the hood of a vehicle should buckle or crumple to prevent the back edge of the hood from going through the windshield and injuring passengers. However, the hood outer panel of some hoods may include ridges, folds, embosses, and/or contour lines formed into the panel material for styling and/or for various functional purposes. In certain embodiments, these features may extend longitudinally in directions generally parallel to the fore-aft axis of the vehicle when the hood outer panel is installed in the vehicle. Such features may make the hood more rigid and resistant to the desired bending and buckling during front-end collision.

SUMMARY

In one aspect of the embodiments described herein, an assembly is provided including a vehicle hood outer panel and a vehicle hood outer panel stretching mechanism coupled to the vehicle hood outer panel. The stretching mechanism includes a first hood attachment portion fixedly attached to the hood outer panel at a first location, and a second hood attachment portion fixedly attached to the hood outer panel at a second location spaced apart a first distance from the first location. The stretching mechanism also includes a first arm having a first arm first end coupled to the first hood attachment portion, and a first arm second end opposite the first arm first end. The stretching mechanism also includes a second arm having a second arm first end coupled to the second hood attachment portion, and a second arm second end opposite the second arm first end. The hood outer panel stretching mechanism is structured so that simultaneous movement of the first arm second end and the second arm second end toward a line extending between the first hood attachment portion and the second hood attachment portion causes movement of the first hood attachment portion and the second hood attachment portion so that a spacing between the first hood attachment portion and the second hood attachment portion increases from the first distance to a second distance greater than the first distance, thereby stretching a portion of the hood outer panel residing between the first hood attachment portion and the second hood attachment portion.

BRIEF DESCRIPTION OF THE DRAWINGS

The accompanying drawings, which are incorporated in and constitute a part of this specification, illustrate embodiments described herein and together with the description serve to explain principles of embodiments described herein.

DETAILED DESCRIPTION

Embodiments described herein relate to a stretching mechanism for stretching the material forming the vehicle hood outer panel. The outer panel is stretched to flatten out the panel, to remove features such as folds, embosses, and/or contour lines that have been formed into the hood outer panel material for decorative and/or functional purposes. The mechanism operates to flatten out the hood outer panel responsive to an impact or collision force acting on a front of the vehicle. The hood outer panel is stretched to remove the features prior to the front impact force crumpling the hood. Removal of the folds, embosses, and/or contour lines prior to crumpling of the hood prevents these features from interfering with the desired crumpling of the hood outer panel, which absorbs collision energy.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

Figure 1A:
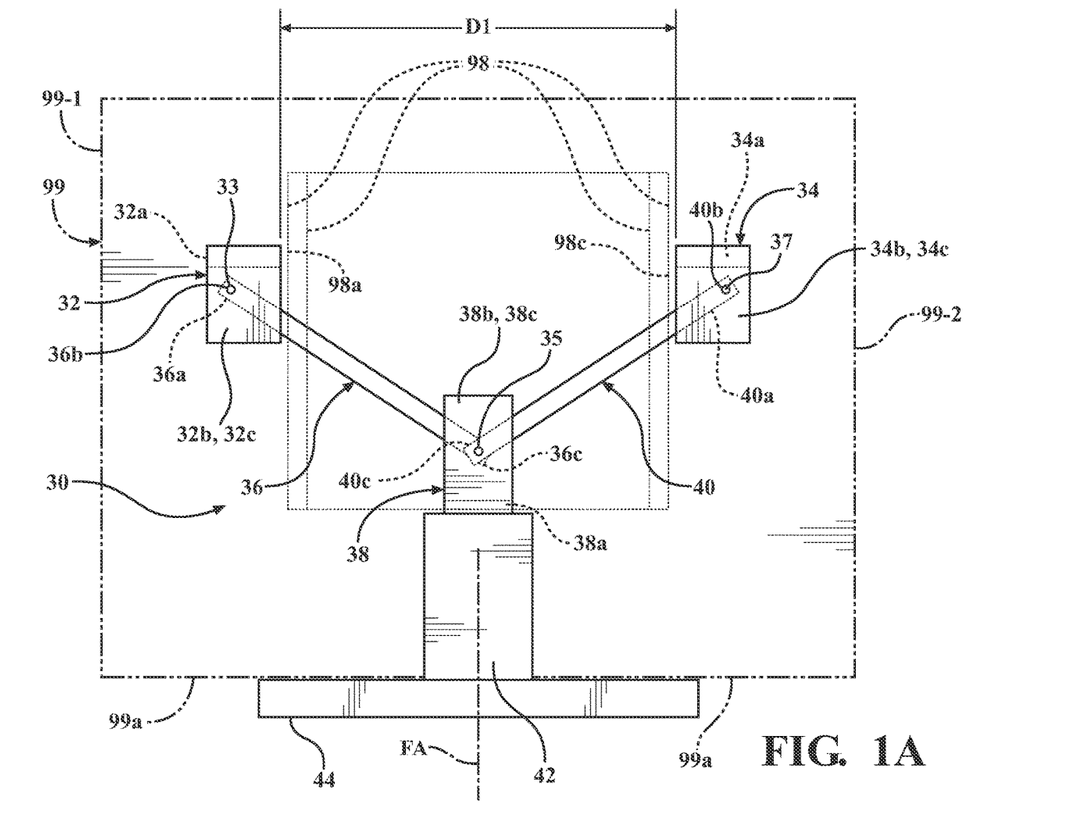
FIG. 1A is a schematic plan view of a vehicle hood outer panel stretching mechanism in accordance with an embodiment described herein, shown coupled to a vehicle hood outer panel prior to application of a collision force to a front portion of a vehicle on which the hood outer panel is mounted.

FIGS. 1A-2B show a first embodiment 30 of the hood outer panel stretching mechanism coupled to a hood outer panel 99. In FIGS. 1A-1B, the hood outer panel 99 is shown in phantom with the stretching mechanism 30 coupled to the hood outer panel below the outer panel. A forward-most portion of the hood outer panel is labeled 99a.

Figure 1B:
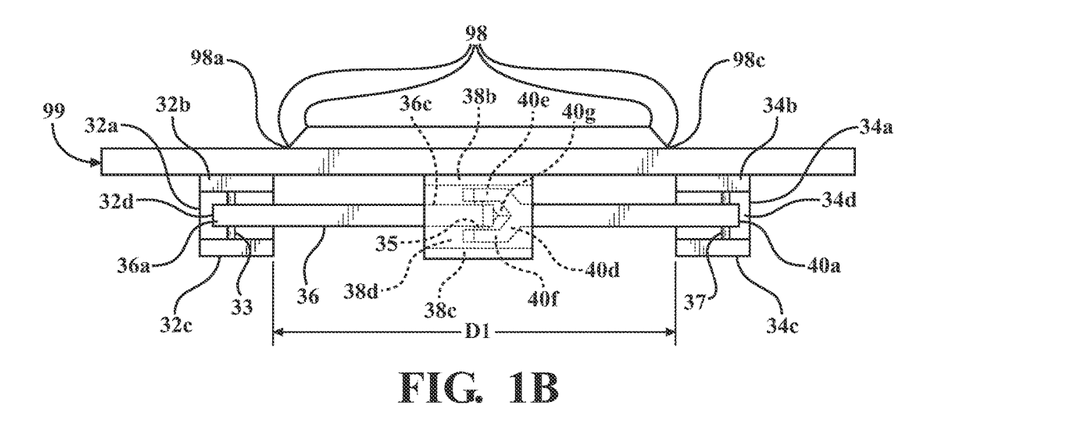
FIG. 1B is a schematic front view of the vehicle hood outer panel stretching mechanism and vehicle hood outer panel shown in FIG. 1A, and showing folds extending from a top or upper surface of a hood outer panel.

FIG. 1A is a schematic plan view of a vehicle hood outer panel stretching mechanism 30 in accordance with an embodiment described herein, shown coupled to a vehicle hood outer panel 99 prior to application of a collision force to a front portion of a vehicle on which the vehicle hood outer panel is mounted. FIG. 1B is a schematic front view of the vehicle hood outer panel stretching mechanism 30 and vehicle hood outer panel 99 shown in FIG. 1A (i.e., as viewed from a front of the vehicle). An assembly may be formed including the vehicle hood outer panel and an embodiment of the vehicle hood outer panel stretching mechanism coupled to the hood outer panel. In addition, the assembly may include other elements.

Referring to the drawings, the vehicle hood outer panel 99 may be a formed metallic panel which is rotatably attached to the vehicle to form a vehicle hood covering the engine, radiator, and other components in a known manner. The vehicle hood outer panel 99 may include ridges, folds, embosses, etc. (generally designated "folds" 98) formed into the panel material for styling and/or for various functional purposes. In certain embodiments, these features may extend longitudinally in directions generally parallel to the fore-aft axis FA of the vehicle when the hood outer panel 99 is installed in the vehicle.

To aid in removing the folds 98 from the hood outer panel 99 to facilitate buckling or crumpling of the hood, an embodiment of a vehicle hood outer panel stretching mechanism may be coupled to the vehicle hood outer panel. In general, embodiments of the hood outer panel stretching mechanism may include a first hood attachment portion fixedly attached to the hood outer panel at a first location, and a second hood attachment portion fixedly attached to the hood outer panel at a second location spaced apart a first distance from the first location. A first arm having a first arm first end may be coupled to the first hood attachment portion. The first arm may also include a first arm second end opposite the first arm first end. Also, a second arm having a second arm first end may be coupled to the second hood attachment portion. The second arm may also include a second arm second end opposite the second arm first end. The hood outer panel stretching mechanism may be structured so that simultaneous movement of the first arm second end and the second arm second end toward a line extending between the first hood attachment portion and the second hood attachment portion causes movement of the first hood attachment portion and the second hood attachment portion so that a spacing between the first hood attachment portion and the second hood attachment portion increases from the first distance to a second distance greater than the first distance, thereby stretching a portion of the hood outer panel residing between the first hood attachment portion and the second hood attachment portion.

In one or more particular embodiments of the hood outer panel stretching mechanism may include an arm coupling portion, a first hood attachment portion fixedly attached to the hood outer panel at a first location, and a second hood attachment portion fixedly attached to the hood outer panel at a second location spaced apart a first distance from the first location. A first arm may be rotatably coupled to the arm coupling portion and the first hood attachment portion. A second arm may be rotatably coupled to the arm coupling portion and the second hood attachment portion. In one or more arrangements, a line extending between the first hood attachment portion and the second hood attachment portion may be a line connecting a rotational axis of the first arm first end with respect to the first hood attachment portion with a rotational axis of the second arm first end with respect to the second hood attachment portion.

As used herein, "fixedly attached" means welded, bolted, or otherwise attached such that the arm coupling portion and the portion of the vehicle hood outer panel to which it is attached move together in response to a force applied to either of the arm coupling portion and the portion of the vehicle hood outer panel. This attachment enables a force applied to the arm coupling portion to stretch the structure of the hood outer panel as described herein.

The spacing between the first hood attachment portion and the second hood attachment portion may be a minimum spacing between the attachment portions, a spacing between designated features of the first hood attachment portion and the second hood attachment portion, or any desired spacing.

The term "rotatably coupled" encompasses elements that are either in direct contact with each other or are connected to each other or arranged with respect to each other such that the coupled elements are rotatable with respect to each other, without bending of the elements.

The first and second arms of the hood outer panel stretching mechanism embodiments described herein may be structured to be rigid (i.e., the arms may be structured to not buckle responsive to axial compressive forces applied to the arms, and also to not compress under loading by more than a predetermined percentage of their unloaded lengths. The first and second arms may be formed from any material suitable for the purposes described herein, for example, a steel.

FIG. 1A also shows examples of suitable attachment locations for the first and second hood attachment portions. Specifically, a first hood attachment portion 32 may be fixedly attached to the hood outer panel 99 at a first location. The first hood attachment portion 32 may be fixedly attached to an underside of the hood outer panel 99 by welding, for example. As seen in FIG. 1A, the first hood attachment portion 32 may be attached to the vehicle hood outer panel 99 at a location between a first edge 99-1 of the outer panel and a first fold 98a encountered when moving from the first edge 99-1 in a direction toward a second edge 99-2 of the hood outer panel 99 opposite the first edge. The first hood attachment portion 32 may have a clevis or "U"-shaped structure including a base portion 32a, a first wall 32b extending from the base portion 32a, and a second wall 32c extending from the base portion 32a opposite the first wall 32b. A cavity 32d may be defined between the first and second walls 32b, 32c for receiving a first end 36a of a first arm 36 therein. Holes may be formed in the first wall 32b and second wall 32c for receiving therethrough a shaft or pin 33 in an interference fit. A through hole 36b may be formed in the first end 36a of the first arm 36. The shaft 33 may be passed through the holes formed in the first wall 32b and second wall 32c and through the first arm hole 36b to rotatably couple the first arm first end 36a to the first hood attachment portion 32.

A second end 36c of the first arm 36 may be rotatably coupled to an arm coupling portion 38. Arm coupling portion 38 may be unattached to the hood outer panel 99, thereby enabling free movement of the arm coupling portion 38 as described herein. The arm coupling portion 38 may have a clevis or "U"-shaped structure including a base portion 38a, a first wall 38b extending from the base portion 38a, and a second wall 38c extending from the base portion 38a opposite the first wall 38b. A cavity 38d may be defined between the first and second walls 38b, 38c for receiving the second end 36c of first arm 36 therein. Holes may be formed in the first wall 38b and second wall 38c for receiving therethrough a shaft or pin 35 in an interference fit. A through hole may be formed in the second end 36c of the first arm 36. The shaft 35 may be passed through the holes formed in the arm coupling portion first wall 38b and second wall 38c and through the hole formed in first arm second end 36c to rotatably couple the first arm second end 36c to the arm coupling portion 38.

The second hood attachment portion 34 may be fixedly attached to an underside of the hood outer panel 99 (by welding, for example) at a second location spaced apart a first distance D1 from the first location. As seen in FIG. 1A, the second hood attachment portion 34 may be attached to the vehicle hood outer panel 99 at a location between a second edge 99-2 of the hood outer panel 99 and a first fold 98c encountered when moving from the second edge 99-2 in a direction toward the first edge 99-1 of the hood outer panel 99. The second hood attachment portion 34 may have a clevis or "U"-shaped structure including a base portion 34a, a first wall 34b extending from the base portion 34a, and a second wall 34c extending from the base portion 34a opposite the first wall 34b. A cavity 34d may be defined between the first and second walls 34b, 34c for receiving a first end 40a of a second arm 40 therein. Holes may be formed in the first wall 34b and second wall 34c for receiving therethrough a shaft or pin 37 in an interference fit. A through hole 40b may be formed in the first end 40a of the second arm 40. The shaft 37 may be passed through the holes formed in the first wall 34b and second wall 34c and through the second arm hole 40b to rotatably couple the second arm first end 40a to the second hood attachment portion 34.

A second end 40c of the second arm 40 may be rotatably coupled to the arm coupling portion 38. Second arm second end 40c may be received in arm coupling portion cavity 38d. Second arm second end 40c may have a clevis or "U"-shaped structure including a base portion 40d, a first wall 40e extending from the base portion 40d, and a second wall 40f extending from the base portion 40d opposite the first wall 40e. A cavity 40g may be defined between the first and second walls 40e, 40f for receiving the second end 36c of first arm 36 therein. Holes may be formed in the first wall 40e and second wall 40f for receiving shaft 35 therein, to rotatably couple the second arm second end 40c to the arm coupling portion 38. In this manner, the first arm 36 may be rotatably coupled to the arm coupling portion 38 so as to rotate about a first rotational axis while the second arm 40 is also rotatably coupled to the arm coupling portion 38 so as to rotate about the first rotational axis.

A force transfer portion 42 may be attached to the arm coupling portion 38. The force transfer portion 42 may extend between the arm coupling portion 38 and a barrier 44 structured to extend forwardly to form a forward-most portion of the vehicle designed to make contact with an object frontally impacting the vehicle, before any other portion of the vehicle makes contact with the object. The barrier 44 may be, for example, a vehicle bumper.

It will be seen that the locations of the hood attachment portions 32, 34 and the dimensions of the force transfer portion 42, the arm coupling portion 38, and/or the arms 36, 40 may be adjusted to account for the position(s) of the hood outer panel folds 98 in relation to the front of the vehicle, the projected inward deflection of the barrier 44 upon collision, and other factors, to achieve a desired amount of stretching of the hood outer panel. Optimal positions and dimensions of the components of the hood outer panel stretching mechanism for a given vehicle design and hood outer panel structure may be determined analytically and/or iteratively through experimentation, using methods known or later devised.

Figure 2A:
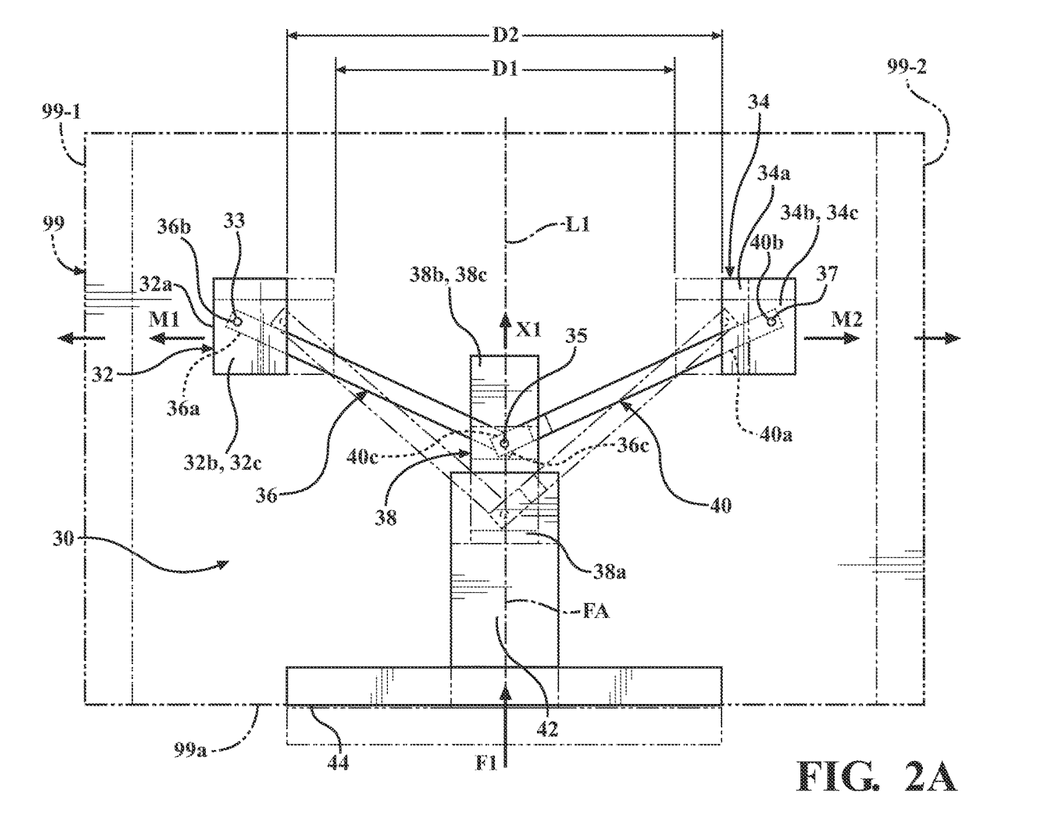
FIG. 2A is a schematic plan view of the vehicle hood outer panel stretching mechanism and vehicle hood outer panel of FIGS. 1A-1B shown after application a collision force to a front portion of the vehicle on which the vehicle hood outer panel is mounted.
Figure 2B:
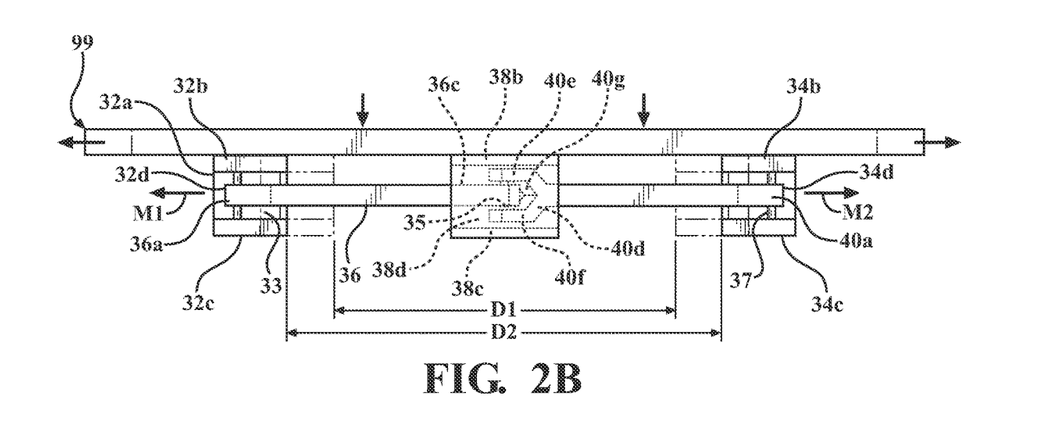
FIG. 2B is a schematic front view of the post-collision vehicle hood outer panel stretching mechanism and vehicle hood outer panel shown in FIG. 2A, after stretching out of the hood outer panel folds.

In operation, referring to FIGS. 2A-2B, when a front-impact force F1 is exerted on barrier 44, the barrier 44 is pushed inwardly in direction X1 (toward a rear of the vehicle). This forces the force transfer portion 42 and the arm coupling portion 38 in direction X1. Movement of the arm coupling portion 38 in direction X1 causes the first arm 36 to rotate with respect to the arm coupling portion 38 and the first hood attachment portion 32, and the second arm 40 to rotate with respect to the arm coupling portion 38 and the second hood attachment portion 34. The arm coupling portion 38 moves along a line L1 extending between the first hood attachment portion 32 and the second hood attachment portion 34. This causes movement of the first hood attachment portion 32 in a first direction M1 away from the fore-aft axis FA of the vehicle, and movement of the second hood attachment portion 34 in a second direction M2 away from the fore-aft axis FA of the vehicle. Thus, the hood attachment portions 32, 34 move laterally outwardly so that a spacing between the first hood attachment portion and the second hood attachment portion increases from the first distance D1 to a second distance D2 greater than the first distance. Lateral movement of the hood attachment portions 32, 34 moves the attached portions of the hood outer panel 99, thereby stretching the portion of the hood outer panel 99 residing between the first hood attachment portion 32 and the second hood attachment portion 34 to flatten out the folds 98. After stretching of the hood outer panel 99, continued relative motion of the impacting object in direction X1 may cause the flattened hood outer panel 99 to crumple or buckle in a desired manner.

Elements of the hood outer panel stretching mechanism of FIGS. 1A-2B may be pre-assembled into a self-contained, single-piece assembly prior to attachment to the vehicle hood outer panel. This assembly may be easily stored and transported prior to attachment to the vehicle hood outer panel.

Figure 3A:
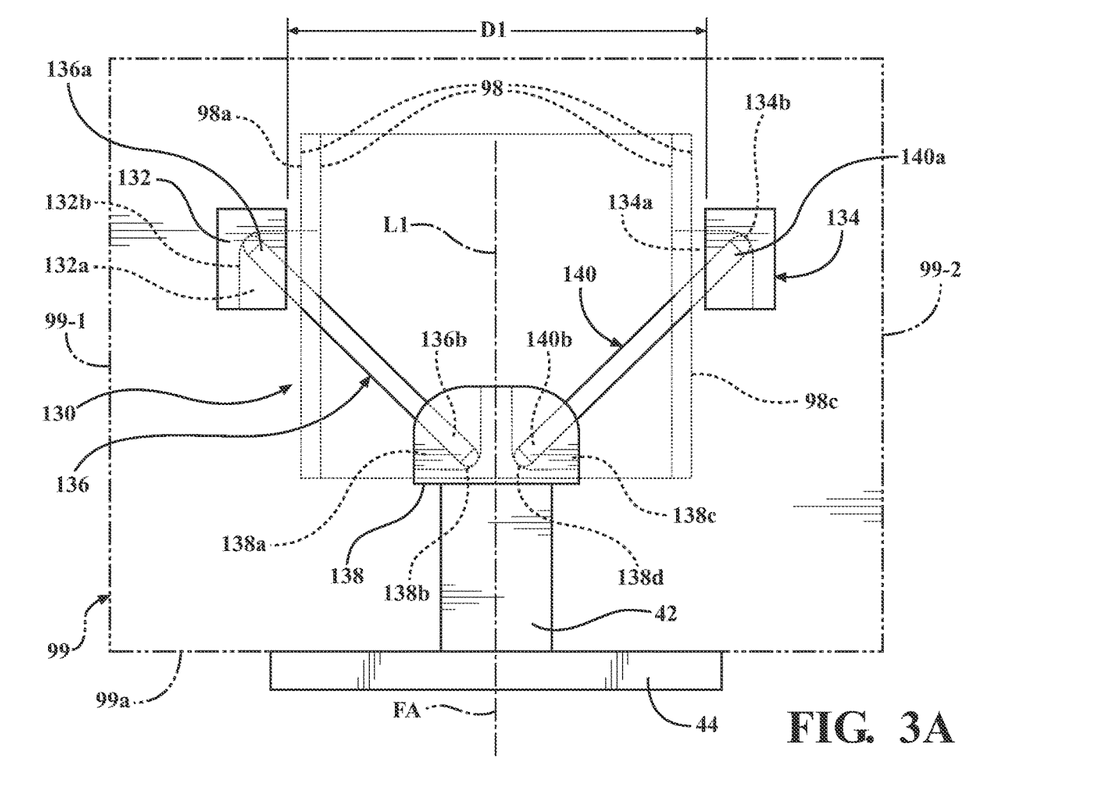
FIG. 3A is a schematic plan view of a vehicle hood outer panel stretching mechanism in accordance with another embodiment described herein, shown coupled to a vehicle hood outer panel prior to application of a collision force to a front portion of a vehicle on which the vehicle hood outer panel is mounted.
Figure 3B:
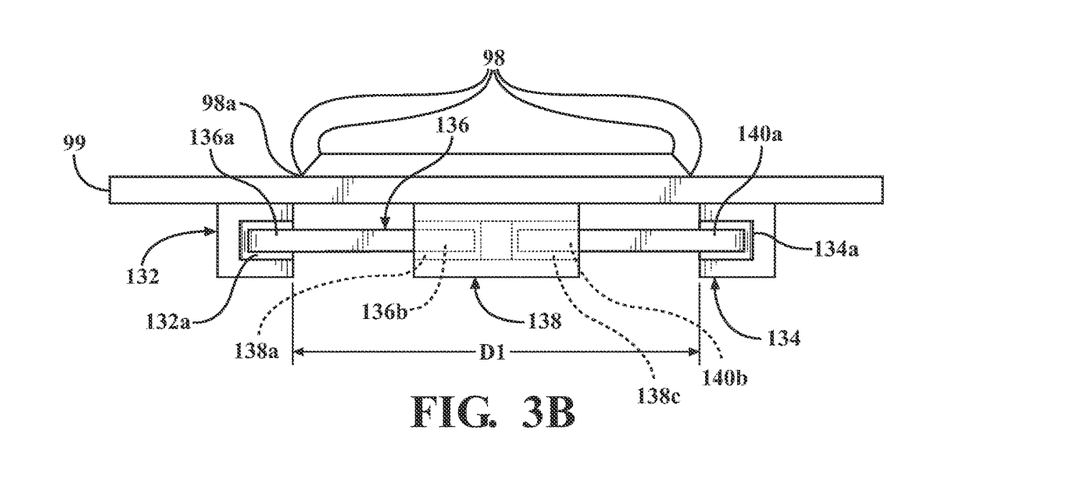
FIG. 3B is a schematic front view of the vehicle hood outer panel stretching mechanism and vehicle hood outer panel shown in FIG. 3A, and showing folds extending from a top or upper surface of a hood outer panel.

FIGS. 3A-4B illustrate the structure and operation of another embodiment 130 of the vehicle hood outer panel stretching mechanism. The hood outer panel 99 is shown in phantom with the stretching mechanism coupled to the hood outer panel below the outer panel. A front-most portion of the hood outer panel is labeled 99a. FIG. 3A also shows examples of suitable attachment locations for first and second hood attachment portions 132, 134. Specifically, a first hood attachment portion 132 may be fixedly attached to the hood outer panel 99 at a first location. The first hood attachment portion 132 may be fixedly attached to an underside of the hood outer panel 99 by welding, for example. As seen in FIG. 3A, the first hood attachment portion 132 may be attached to the vehicle hood outer panel 99 at a location between a first edge 99-1 of the outer panel and the first fold 98a encountered when moving from the first edge 99-1 in a direction toward the second edge 99-2 of the hood outer panel 99. The first hood attachment portion 132 may be in the form of a receptacle having a cavity 132a structured to receive a portion of a first arm 136 therein such that the portion of the first arm 136 is rotatable with respect to the first hood attachment portion 132 within the first hood attachment portion cavity 132a. The cavity 132a may have a radius 132b formed along intersecting walls thereof. The radiused portion of the cavity 132a may be structured for contact with a first end 136a of the first arm 136, to facilitate rotation of the first arm 136 with respect to the first hood attachment portion 132.

In one or more arrangements, the first end 136a of the first arm 136 may have a radius formed thereon. To facilitate rotation of the first arm first end 136a with respect to the first hood attachment portion 132, the radius at the first end 136a of the first arm 136 may be smaller than the radius 132b of the first hood attachment portion cavity 132a. The radius may be formed at the first arm first end 136a by any suitable method, for example by machining or attachment of a separately formed cap to the first end of the first arm 136.

A arm coupling portion 138 may be in the form of a receptacle having a first cavity 138a structured to receive a second end 136b of the first arm 136 therein such that the second end 136b of the first arm 136 is rotatable with respect to the arm coupling portion 138 within the arm coupling portion first cavity 138a. The first cavity 138a may have a radius 138b formed along intersecting walls thereof. The radiused portion of the first cavity 138a may be structured for contact with the second end 136b of the first arm 136, to facilitate rotation of the first arm 136 with respect to the arm coupling portion 138. Arm coupling portion 138 may be unattached to the hood outer panel 99, thereby enabling free movement of the arm coupling portion 138 as described herein.

In one or more arrangements, the second end 136b of the first arm 136 may have a radius formed thereon. To facilitate rotation of the first arm second end 136b with respect to the arm coupling portion 138, the radius at first arm second end 136b may be smaller than the radius 138b of the arm coupling portion first cavity 138a. The radius may be formed at the first arm second end 136b by any suitable method, for example by machining or attachment of a separately formed cap to the second end 136b of the first arm 136.

A second hood attachment portion 134 may be fixedly attached to an underside of the hood outer panel 99 (by welding, for example) at a second location spaced apart a first distance D1 from the first location. As seen in FIG. 3A, the second hood attachment portion 134 may be attached to the vehicle hood outer panel 99 at a location between a second edge 99-2 of the hood outer panel 99 and a first fold 98c encountered when moving from the second edge 99-2 in a direction toward the first edge 99-1 of the hood outer panel 99. The second hood attachment portion 134 may be in the form of a receptacle having a cavity 134a structured to receive a portion of a second arm 140 therein such that the portion of the second arm 140 is rotatable with respect to the second hood attachment portion 134 within the second hood attachment portion cavity 134a. The cavity 134a may have a radius 134b formed along intersecting walls thereof. The radiused portion of the cavity 134a may be structured for contact with a first end 140a of the second arm 140, to facilitate rotation of the second arm 140 with respect to the second hood attachment portion 134.

In one or more arrangements, the first end 140a of the second arm 140 may have a radius formed thereon. To facilitate rotation of the second arm first end 140a with respect to the second hood attachment portion 134, the radius formed at the first end 140a of the second arm 140 may be smaller than the radius 134b of the second hood attachment portion cavity 134a. The radius may be formed at the second arm first end 140a by any suitable method, for example by machining or attachment of a separately formed cap to the first end 140a of the second arm 140.

Arm coupling portion 138 may also include a second cavity 138c structured to receive a second end 140b of the second arm 140 therein such that the second end 140b of the second arm 140 is rotatable with respect to the arm coupling portion 138 within the arm coupling portion second cavity 138c. The second cavity 138c may have a radius 138d formed along intersecting walls thereof. The radiused portion of the second cavity 138c may be structured for contact with the second end 140b of the second arm 140, to facilitate rotation of the second arm 140 with respect to the arm coupling portion 138.

In one or more arrangements, the second end 140b of the second arm 140 may have a radius formed thereon. To facilitate rotation of the second arm second end 140b with respect to the arm coupling portion 138, the radius formed at the second end 140b of the second arm 140 may be smaller than the radius 138d of the arm coupling portion second cavity 138c. The radius may be formed at the arm second end 140b by any suitable method, for example by machining or attachment of a separately formed cap to the second end 140b of the second arm 140.

Force transfer portion 42 may be attached to the arm coupling portion 138. As previously described, the force transfer portion 42 may extend between the arm coupling portion 138 and a barrier 44 structured to extend forwardly to form a forward-most portion of the vehicle designed to make contact with an object frontally impacting the vehicle, before any other portion of the vehicle makes contact with the object. The barrier 44 may be, for example, a vehicle bumper.

It will be seen that the locations of the hood attachment portions 132, 134 and the dimensions of the force transfer portion 42, the arm coupling portion 138, and/or the arms 136, 140 may be adjusted to account for the position(s) of the hood outer panel folds 98 in relation to the front of the vehicle, the projected inward deflection of the barrier 44 upon collision, and other factors to achieve a desired amount of stretching of the hood outer panel. Optimal positions and dimensions of the components of the hood outer panel stretching mechanism for a given vehicle design and hood outer panel structure may be determined analytically and/or iteratively through experimentation, using methods known or later devised.

Figure 4A:
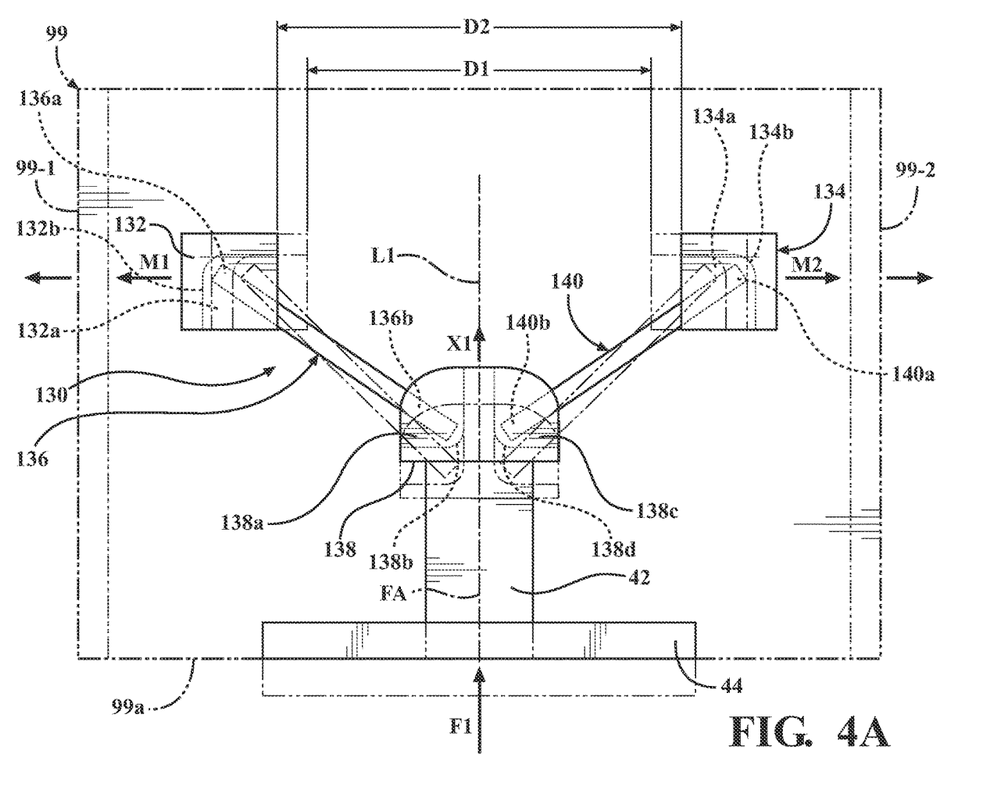
FIG. 4A is a schematic plan view of the vehicle hood outer panel stretching mechanism and vehicle hood outer panel of FIGS. 3A-3B shown after application a collision force to a front portion of the vehicle on which the vehicle hood outer panel is mounted.
Figure 4B:
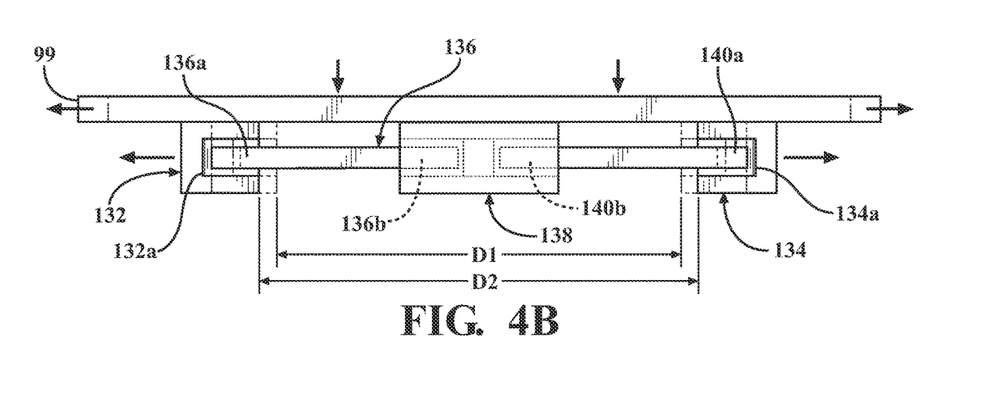
FIG. 4B is a schematic front view of the post-collision vehicle hood outer panel stretching mechanism and vehicle hood outer panel shown in FIG. 4A, after stretching out of the hood outer panel folds.

In operation, referring to FIGS. 4A-4B, when a front-impact force F1 is exerted on barrier 44, the barrier 44 is pushed inwardly in direction X1 (toward a rear of the vehicle). This forces the force transfer portion 42 and the arm coupling portion 138 in direction X1. Movement of the arm coupling portion 138 in direction X1 causes the first arm 136 to rotate with respect to the arm coupling portion 138 and the first hood attachment portion 132, and the second arm 140 to rotate with respect to the arm coupling portion 138 and the second hood attachment portion 134.

The arm coupling portion 138 moves along a line L1 extending between the first hood attachment portion 132 and the second hood attachment portion 134. This causes movement of the first hood attachment portion 132 in a first direction M1 away from the fore-aft axis FA of the vehicle, and movement of the second hood attachment portion 134 in a second direction M2 away from the fore-aft axis FA of the vehicle. Thus, the hood attachment portions 132, 134 move laterally outwardly so that a spacing between the first hood attachment portion 132 and the second hood attachment portion 134 increases from the first distance D1 to a second distance D2 greater than the first distance. Lateral movement of the hood attachment portions 132, 134 moves the attached portions of the hood outer panel 99, thereby stretching the portion of the hood outer panel 99 residing between the first hood attachment portion 132 and the second hood attachment portion 134 to flatten out the folds 98. After stretching of the hood outer panel 99, continued relative motion of the impacting object in direction X1 may cause the flattened hood outer panel to crumple or buckle in a desired manner.

The hood outer panel stretching mechanism structure of FIGS. 3A-4B may enable the mechanism to be adjusted for operability on different vehicles by simply swapping out arms 136, 140 and/or force transfer portions 42 of different lengths, according to the dimensions of a particular vehicle hood outer panel.

Figure 5:
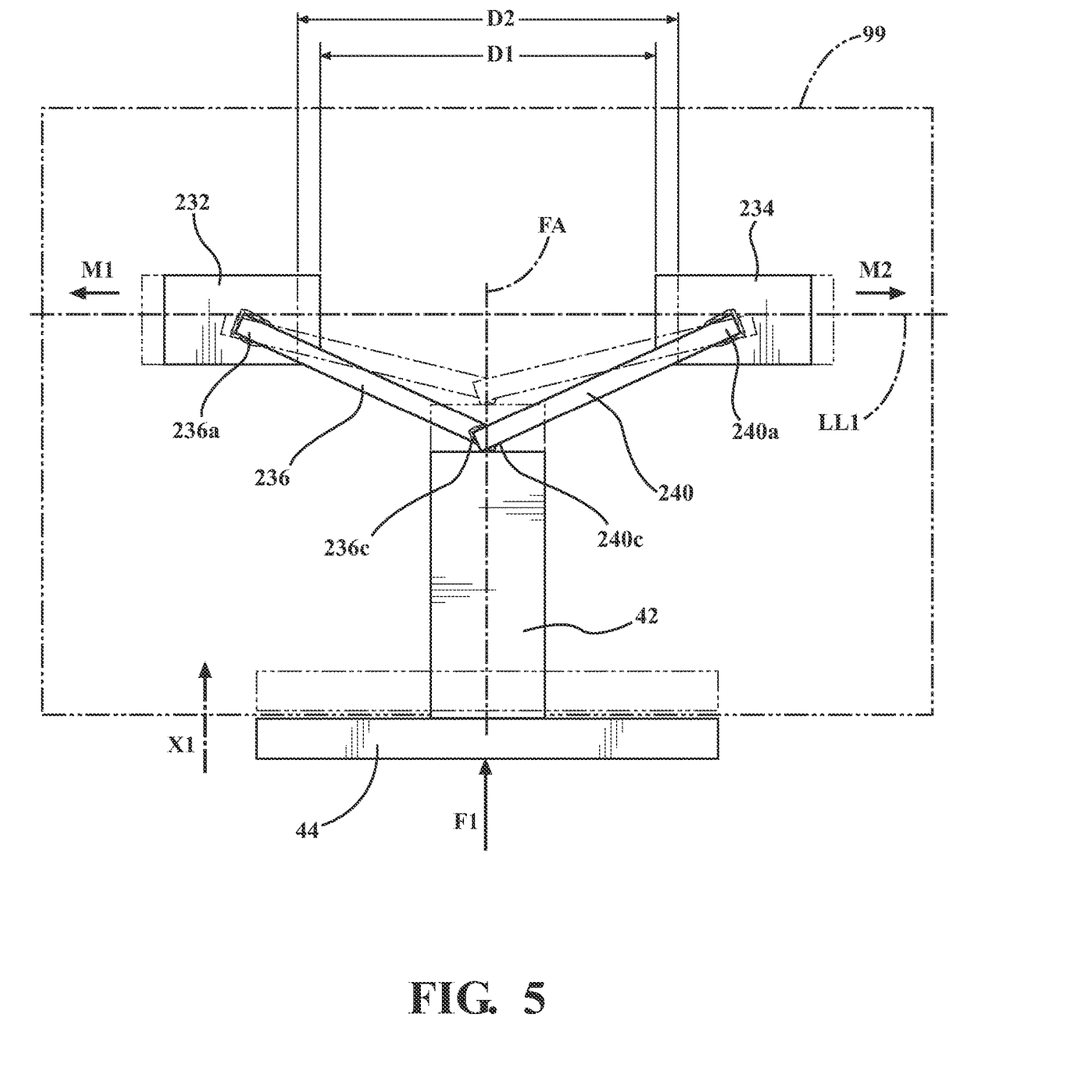
FIG. 5 is a schematic plan view of a configuration of another embodiment of the vehicle hood outer panel stretching mechanism before operation of the mechanism (shown in solid lines) and after operation of the mechanism (shown in phantom lines) to stretch out folds formed in the hood outer panel.

FIG. 5 shows another alternative embodiment of the assembly including a first arm 236, a second arm 240, a first hood attachment portion 232, and a second hood attachment portion 234. A first arm first end 236a may be welded or otherwise fixedly connected to the first hood attachment portion 232, and a second arm first end 240a may be welded or otherwise fixedly connected to the second hood attachment portion 234. A first arm second end 236c and second arm second end 240c may be welded or otherwise fixedly connected to each other. The first and second hood attachment portions 232, 234 may be attached to the hood outer panel 99 as previously described. A junction between the first arm second end 236c and second arm second end 240c may be attached to the force transfer portion 42 using any suitable method, for example, one or more fasteners.

As seen in FIG. 5 and in a manner similar to that previously described, when a front-impact force F1 in direction X1 is transmitted to force transfer portion 42, simultaneous movement of the first arm second end 236c and the second arm second end 240c in direction X1 toward a line LL1 extending between the first hood attachment portion 232 and the second hood attachment portion 234 causes movement of the first hood attachment portion 232 and the second hood attachment portion 234 away from each other. First hood attachment portion 232 may move in the first direction M1 away from the fore-aft axis FA of the vehicle, and the second hood attachment portion 234 may move in a second direction M2 away from the fore-aft axis FA of the vehicle. Thus, the hood attachment portions 232, 234 move laterally outwardly so that a spacing between the first hood attachment portion 232 and the second hood attachment portion 234 increases from the first distance D1 to a second distance D2 greater than the first distance. Because the first arm first end 236a is fixedly (i.e., non-rotatably) attached to the first hood attachment portion 232 and the first hood attachment portion 232 is fixedly attached to the hood outer panel 99, a portion of the first arm 236 near the first arm first end 236a may bend responsive to movement of the first arm second end in direction X1. Similarly, because the second arm first end 240a is fixedly attached to the second hood attachment portion 234 and the second hood attachment portion 234 is fixedly attached to the hood outer panel 99, a portion of the second arm 240 near the second arm first end 240a may bend responsive to movement of the second arm second end in direction X1. Also, portions of the first arm second end 236c and the second arm second end 240c near the junction of these ends may bend responsive to the applied forces.

Lateral movement of the hood attachment portions 232, 234 moves the attached portions of the hood outer panel 99 as previously described, thereby stretching the portion of the hood outer panel 99 residing between the first hood attachment portion 232 and the second hood attachment portion 234 to flatten out the folds 98. After stretching of the hood outer panel 99, continued relative motion of an impacting object in direction X1 may cause the flattened hood outer panel 99 to crumple or buckle in a desired manner. In one or more arrangements, the line extending between the first hood attachment portion and the second hood attachment portion may be a line connecting the portion of the first arm first end 236a fixedly attached to the first hood attachment portion 232, with the portion of the second arm first end 240a fixedly attached to the second hood attachment portion 234.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. An assembly comprising:
a vehicle hood outer panel; and
a vehicle hood outer panel stretching mechanism coupled to the vehicle hood outer panel, the stretching mechanism including:
a first hood attachment portion fixedly attached to the hood outer panel at a first location;
a second hood attachment portion fixedly attached to the hood outer panel at a second location spaced apart a first distance from the first location;
a first arm having a first arm first end coupled to the first hood attachment portion, and a first arm second end opposite the first arm first end; and
a second arm having a second arm first end coupled to the second hood attachment portion, and a second arm second end opposite the second arm first end,
wherein the hood outer panel stretching mechanism is structured so that simultaneous movement of the first arm second end and the second arm second end toward a line extending between the first hood attachment portion and the second hood attachment portion causes movement of the first hood attachment portion and the second hood attachment portion so that a spacing between the first hood attachment portion and the second hood attachment portion increases from the first distance to a second distance greater than the first distance, thereby stretching a portion of the hood outer panel residing between the first hood attachment portion and the second hood attachment portion.

2. The assembly of claim 1 further comprising an arm coupling portion, wherein the first arm second end is rotatably coupled to the arm coupling portion and the first arm first end is rotatably coupled to the first hood attachment portion, and the second arm second end is rotatably coupled to the arm coupling portion and the second arm first end is rotatably coupled to the second hood attachment portion, and wherein the hood outer panel stretching mechanism is structured so that movement of the arm coupling portion along a line extending between the first hood attachment portion and the second hood attachment portion causes movement of the first hood attachment portion and the second hood attachment portion so that the spacing between the first hood attachment portion and the second hood attachment portion increases from the first distance to the second distance.

3. The assembly of claim 2 further comprising a force transfer portion coupled to the arm coupling portion so as to communicate a force applied to the force transfer portion to the arm coupling portion.

4. The assembly of claim 3 wherein the force transfer portion is coupled to a barrier structured to extend forwardly of a forward-most edge of the vehicle hood outer panel when the vehicle hood outer panel is assembled into the vehicle.

5. The assembly of claim 2 wherein the hood outer panel stretching mechanism is structured so that movement of the arm coupling portion along the line extending between the first hood attachment portion and the second hood attachment portion causes movement of the first hood attachment portion in a first direction away from a fore-aft axis of a vehicle and movement of the second hood attachment portion in a second direction away from a fore-aft axis of a vehicle when the vehicle hood outer panel is assembled into the vehicle.

6. The assembly of claim 2 wherein the first arm second end is rotatably coupled to the arm coupling portion so as to rotate about a first rotational axis and the second arm second end is rotatably coupled to the arm coupling portion so as to rotate about the first rotational axis.

7. The assembly of claim 6 wherein the first arm second end and the second arm second end are rotatably coupled to the arm coupling portion by a common shaft.

8. The assembly of claim 2 wherein the arm coupling portion comprises a receptacle including a first cavity structured to receive a portion of the first arm therein such that the portion of the first arm is rotatable with respect to the receptacle within the first cavity, and a second cavity structured to receive a portion of the second arm therein such that the portion of the second arm is rotatable with respect to the receptacle within the second cavity.

9. The assembly of claim 2 wherein the first hood attachment portion comprises a receptacle including a cavity structured to receive a portion of the first arm therein such that the portion of the first arm is rotatable with respect to the receptacle within the first hood attachment portion receptacle cavity.

10. The assembly of claim 2 wherein the second hood attachment portion comprises a receptacle including a cavity structured to receive a portion of the second arm therein such that the portion of the second arm is rotatable with respect to the receptacle within the second hood attachment portion receptacle cavity.

11. The assembly of claim 1 wherein the first arm second end is fixedly connected to the second arm second end, the first arm first end is fixedly connected to the first hood attachment portion, and the second arm first end is fixedly connected to the second hood attachment portion.

12. The assembly of claim 1 wherein the first hood attachment portion is attached to the vehicle hood outer panel at a location between a first edge of the outer panel and at least one fold formed into the vehicle hood outer panel, and wherein the second hood attachment portion is attached to the vehicle hood outer panel at a location between a second edge of the hood outer panel residing opposite the first edge and the at least one fold.

* * * * *